F. MILLS.
Tire Setter.

No. 90,458.  Patented May 25, 1869.

Witnesses.
Wm. A. Morgan
Jno. F. Brooks

Inventor.
F. Mills
per Munn & Co.
Attys

United States Patent Office.

FRANCIS MILLS, OF MOUNT VERNON, INDIANA.

Letters Patent No. 90,458, dated May 25, 1869.

DEVICE FOR SETTING WAGON-TIRES.

The Schedule referred to in these Letters Patent and making part of the same.

*To all whom it may concern:*

Be it known that I, FRANCIS MILLS, of Mount Vernon, in the county of Posey, and State of Indiana, have invented a new and useful Improvement in Tire-Setting Machines; and I do hereby declare that the following is a full, clear, and exact description thereof, which will enable others skilled in the art to make and use the same, reference being had to the accompanying drawings, forming part of this specification.

This invention relates to improvements in apparatus for setting tires on wheels; and It consists mainly in providing a suitable frame or table, which is journalled in a stationary one, with rollers, to facilitate the turning of the wheel to which the tire is to be or has been applied.

Similar letters of reference indicate like parts.

Figure 1:
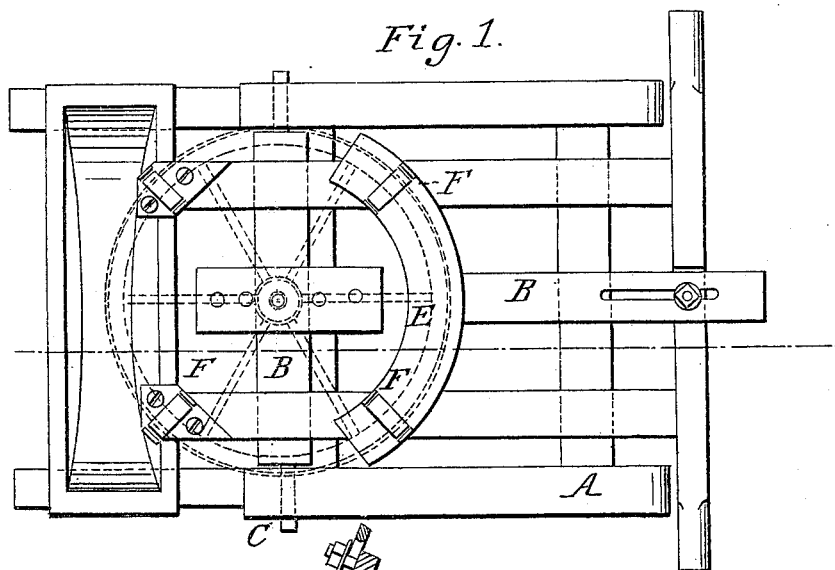
Figure 1 represents a plan view of my improved apparatus, with a wheel thereon shown in red.
Figure 2:
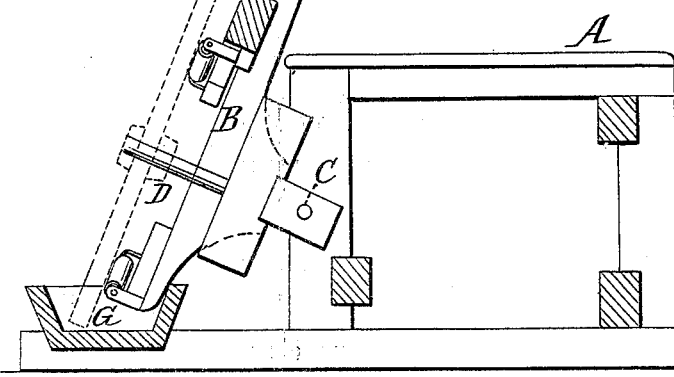
Figure 2 represents a sectional elevation, showing the table turned to present the wheel to the water-trough; also with a wheel thereon shown in red.

A represents a suitable framing, whereon a table, B, is arranged on journals C, and so balanced that it will rest in a horizontal plane.

The said table is provided with a spindle, D, which is designed to take into the eye of the hub, and with block E, of segmental form, for supporting the rim of the wheel, which is designed to be placed on the table B, to receive the tire, as represented in red.

The said block is provided with the rollers F, to facilitate the turning of the wheels.

The block E is adjustable, to suit wheels of various sizes, by means of the slotted bar B, and, the pin D being also adjustable in holes made in the block H, the rim of the wheel may always rest on the rollers F.

G represents a water-trough, connected to the projecting ends of the sills or lower timbers of the stationary frame A, to receive the lower portion of the wheel, when the table is turned for the purpose.

The operation will be fully understood without further description.

I am aware of the patent granted to Jacob Courtleyow, September 29, 1868, for a tire-setting and cooling machine; but, as the same constitutes no part of my invention, I claim nothing therein shown or described.

Having thus described my invention,

I claim as new, and desire to secure by Letters Patent—

The table B, provided with the rollers F, and arranged on the journals C, in the framing A, the pin D, adjustable in the block H, the segmental block E, adjustable by means of the slotted bar B, and the trough G, connected to the projecting ends of the sills of frame A, as and for the purpose herein described.

Witnesses:            FRANCIS MILLS.
JAMES W. WHITWORTH,
JOHN W. JENKINS.